Patented May 25, 1948

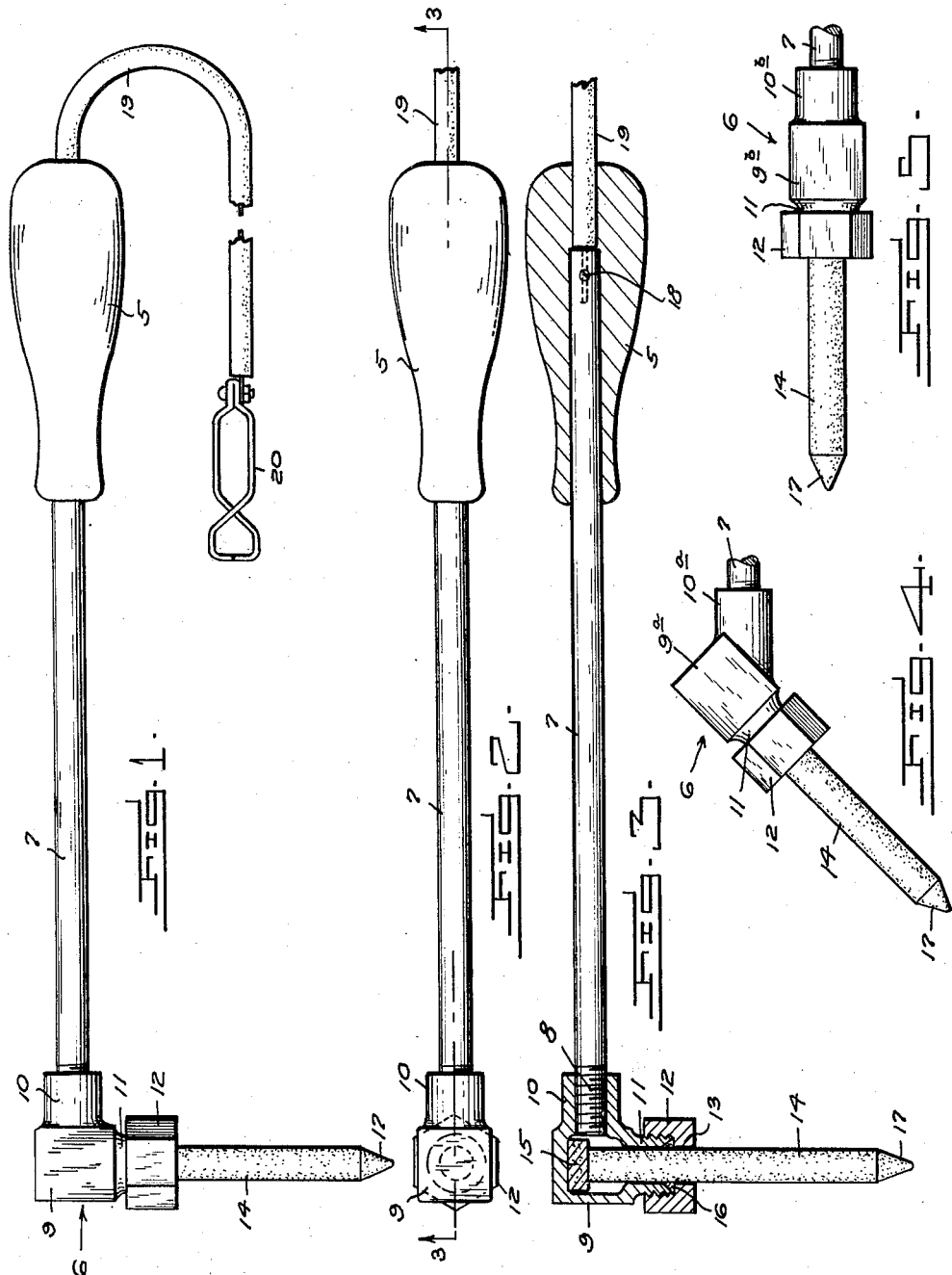

2,442,152

UNITED STATES PATENT OFFICE 2,442,152

SOLDERING TOOL

Thomas H. Truax and Walter C. Cover, Hollywood, Fla.

Application March 31, 1947, Serial No. 738,360

1 Claim. (Cl. 219—26)

This invention relates to an improvement in tools for electric soldering and has reference to a tool for creating an arc at the point of soldering as the heating means for the solder.

It is an object of the present invention to provide a soldering tool embodying a soldering point of non-metallic material adapted to serve as an electrical conductor and, with the object to be soldered as a ground conductor, creates an electrical arc as the medium for melting and applying the solder.

A further object of the invention resides in a tool having a single electrical conductor and a soldering point of non-metallic material, such tool being particularly adaptable for use in automotive work, radio repair shops, aircraft and many other places where an instantaneous soldering is desirable and where the source of current is from the conventional storage battery.

Another and important object of the invention is the extremely simple construction of the tool, the ease of replacement of soldering points, means embodied in its construction to check the transmission of heat to the handle portion, cheapness of manufacture and is highly convenient and efficient in use.

Other and important objects and advantages of the invention will readily present themselves during the course of the following description, reference being had to the accompanying drawings.

In the drawings:

Figure 1 is a side elevation of a tool constructed in accordance with the invention.

Figure 2 is a plan view thereof,

Figure 3 is a central vertical longitudinal section, taken on line 3—3 of Figure 2, Figure 4 is a side view of a modified form of attachment head for the tool and, Figure 5 is a similar view of a further modified form of attachment head.

Like numerals are employed to designate like parts throughout the several figures.

Referring specifically to the drawings, the numeral 5 designates a handle portion, formed of wood, plastic, Bakelite or other desirable material and, 6 designates as a whole the attachment head. The head 6 and handle 5 are connected by a rod 7, of a material to readily conduct an electrical current and is fitted into the handle 5 in any convenient manner, as by a force fit, while the opposite end is threaded, as at 8, for detachable connection with the head 6. The head 6 comprises a metallic body portion 9, preferably formed square and this head is provided with a tubular, internally threaded boss 10, for engagement with the threaded end 8 of the rod 7. The body portion 9 is further provided with a tubular, externally threaded boss 11, arranged at an angle of ninety degrees with respect to the boss 10. A packing nut 12 engages the threaded boss 11 and this packing nut is provided with a centrally arranged opening 13 for the insertion of a non-metallic soldering point 14. The point 14 passes through the nut 12 and tubular boss 11 and seats against a heat insulating washer 15 arranged in the body portion 9. Suitable packing 16 may be arranged between the nut 12 and the boss 11 to provide sufficient frictional engagement with the point 14 to avoid accidental displacement.

The point 14 is formed of carbon or other suitable material that will readily conduct an electrical current, while at the same time will withstand an arcing at its tapered end 17 during the soldering operation. The washer 15 is preferably formed of asbestos or some other suitable non-heat conducting material and serves to retard the passage of heat from the point 14 to the rod 7 and handle 5.

The form of the invention illustrated in Figure 4 embodies an identical type of head 6 having a body portion 9a and a boss 10a for engagement with the rod 7. The boss 10a is arranged at an angle of forty-five degrees with respect to the body 9 and serves to provide a replacement soldering head for convenience in soldering in places that are difficult to get at which the ninety-degree head.

The form of the invention shown in Figure 5 comprises a head 9b with its threaded boss 10b for engagement with the rod 7. This form of the invention is identical in every respect to the head 6, with the exception that the parts are arranged in a straight line position and in axial alignment with the rod 7. This also is a fixture to replace the head 6 for use of the tool in places difficult to reach with either of the forms of Figures 1 or 4.

The terminal end of the rod 7 in the handle 5, has connection at 18 with a single wire electrical conductor, 19, suitably insulated and having its opposite terminal end connected with a conventional spring clip or other fastening device 20, for convenient attachment to a battery terminal or other hot wire connection.

In use, it being assumed that the part to be soldered is grounded, the clip 20 is engaged with the battery terminal, or any other convenient point of connection from the hot side of the battery and the point 14 brought into slightly spaced position to the member to be soldered or, to a point where arcing occurs. The solder strip is inserted into the arc and is instantaneously melted to unite the parts to be soldered. Continuous soldering obviously causing the point 14 to become heated, this heat will be transmitted upward and toward the rod 7 and handle 5. To maintain this heat transmission to a minimum, the washer 15 is provided and serves to definitely check the heat from the end of the point 14 and reverse its flow back to the point 17. Obviously, a relatively small degree of heat will radiate laterally from the body of the point 14 to the nut 12 and body 9, but the amount of heat so radiating will be negligible and in actual use over an extended period, the rod 7 and handle 5 never attain a temperature uncomfortable to the hand of the operator.

It will be seen from the foregoing, that an extremely simple and efficient form of soldering tool has been provided. The device is particularly adapted for use in places where current is not readily available, such as in automotive work, radio repair, aircraft or other places where a quick and convenient soldering job is to be done. The device is ready for instant soldering the minute it is clipped to a hot wire connection and avoids the long wait necessary in heating the conventional electrical soldering irons. The parts are few and simple, requiring only the replacement of the carbon point 14 at relatively long intervals. The use of the heat retarding washer 15 assures a comfortable working temperature to the operator, regardless of the length of time the tool is in use. The replacement heads are readily substituted where soldering is to be done in places difficult to reach. The device is cheap to manufacture, is strong, durable and highly convenient in use.

It is to be understood that the invention is not limited to the precise form shown, but that it includes within its purview whatever changes fairly come within either the terms or the spirit of the appended claim.

Having described our invention, what we claim is:

A soldering device comprising a non-metallic handle portion, a rod carried by the handle and fixed with respect thereto, a conductor wire extending into the handle and connected with the rod, the free end of said rod provided with screw threads, a hollow head portion, an internally threaded boss formed upon the head for detachable engagement with the threaded end of the rod, a tubular externally threaded boss formed upon the head at an angle with respect to the first named boss, a clamping nut having threaded engagement with the second named boss, said nut provided with a centrally arranged cylindrical opening, a carbon soldering point extending through the opening in the nut and the second named boss and seating within the hollow head portion, a heat insulating washer between the inner end of the point and the inner surface of the head portion, friction packing between the nut and the carbon point, the free outer end of the point being tapered and a spring clip carried by the free end of the conductor wire.

THOMAS H. TRUAX.
WALTER C. COVER.

REFERENCES CITED

The following references are of record in the file of this patent:

UNITED STATES PATENTS

| Number | Name | Date |
|---|---|---|
| 1,347,776 | Chadwick | July 27, 1920 |
| 2,345,532 | Eriksen | Mar. 28, 1944 |
| 2,398,946 | Lorant et al. | Apr. 23, 1946 |